US006268026B1

(12) United States Patent
Jester et al.

(10) Patent No.: US 6,268,026 B1
(45) Date of Patent: Jul. 31, 2001

(54) MULTILAYER LAMINATE FORMED FROM A SUBSTANTIALLY STRETCHED NON-MOLTEN WHOLLY AROMATIC LIQUID CRYSTALLINE POLYMER AND NON-LIQUID CRYSTALLINE POLYESTER AND METHOD FOR FORMING SAME

(75) Inventors: Randy D. Jester, Greer, SC (US); Arnold E. Wolf, Charlotte, NC (US); Robert M. Kimmel, Greenville, SC (US); Dominick Cangiano, Neshanic, NJ (US); John A. Penoyer, Greenville, SC (US)

(73) Assignee: Hoechst Celanese Corporation, Warren, NJ (US)

( * ) Notice: Subject to any disclaimer, the term of this patent is extended or adjusted under 35 U.S.C. 154(b) by 0 days.

(21) Appl. No.: 08/954,379

(22) Filed: Oct. 20, 1997

(51) Int. Cl.⁷ .......................... B32B 27/08; B32B 27/36; B32B 31/14; B32B 31/16

(52) U.S. Cl. .......................... 428/1.6; 428/1.1; 428/35.7; 428/36.9; 428/36.91; 428/480; 428/910; 264/500; 264/510; 264/512; 264/513; 264/514; 264/515; 264/516; 264/523; 264/529; 264/531; 264/532; 264/544; 264/563; 264/173.11; 264/173.12; 264/173.15; 264/173.16; 264/210.1; 264/288.4; 264/290.2

(58) Field of Search .............................. 428/1, 910, 34.2, 428/35.2, 35.4, 35.7, 36.6, 36.7, 36.9, 39.91, 480; 156/244.1, 244.24, 245; 264/523, 529, 531, 532, 535, 544, 563, 173.11, 173.12, 173.15, 173.16, 210.1, 280, 290.2, 288.4

(56) References Cited

U.S. PATENT DOCUMENTS

| 3,869,056 | 3/1975 | Valyi ..................... 215/1 C |
|---|---|---|
| 3,955,697 | 5/1976 | Valyi ..................... 215/1 C |
| 4,230,768 | 10/1980 | Hamada et al. ..................... 428/352 |
| 4,318,841 | * 3/1982 | East et al. ............................. 524/605 |
| 4,327,137 | 4/1982 | Sawa et al. ............................. 428/35 |
| 4,340,721 | 7/1982 | Bonnebat et al. .................... 528/272 |
| 4,384,016 | 5/1983 | Ide et al. ................................. 428/1 |
| 4,414,226 | 11/1983 | Ikushima et al. ..................... 424/279 |
| 4,414,230 | 11/1983 | Hanabata et al. .................... 426/106 |
| 4,414,266 | 11/1983 | Archer et al. .......................... 428/287 |
| 4,415,727 | 11/1983 | Toga et al. ............................ 528/272 |
| 4,473,682 | 9/1984 | Calundann et al. ................. 524/605 |
| 4,501,781 | 2/1985 | Kushida et al. ........................ 428/35 |
| 4,535,901 | 8/1985 | Okudaira et al. ..................... 215/1 C |
| 4,550,043 | 10/1985 | Beck ....................................... 428/36 |
| 4,711,624 | 12/1987 | Watson ................................. 425/384 |
| 4,713,269 | 12/1987 | Jabarin et al. ......................... 428/35 |
| 4,713,270 | 12/1987 | Jabarin et al. ......................... 428/35 |
| 4,717,624 | 1/1988 | Ikenaga et al. ..................... 428/423.1 |
| 4,728,549 | 3/1988 | Shimizu et al. ....................... 428/35 |
| 4,743,479 | 5/1988 | Nakamura et al. ..................... 428/35 |
| 4,774,047 | 9/1988 | Nakamura et al. .................. 264/513 |
| 4,803,036 | 2/1989 | Maruhashi et al. .................. 264/526 |
| 4,816,308 | 3/1989 | Shimizu et al. ..................... 428/36.7 |
| 4,840,640 | 6/1989 | Miura et al. .............................. 8/506 |
| 4,847,129 | 7/1989 | Collette et al. ..................... 428/35.7 |
| 4,861,630 | 8/1989 | Mihalich .............................. 428/34.1 |
| 4,868,026 | 9/1989 | Shimizu et al. ..................... 428/36.7 |
| 4,874,647 | 10/1989 | Yatsu et al. ......................... 428/35.7 |
| 4,911,963 | 3/1990 | Lustig et al. ....................... 428/36.91 |
| 4,994,313 | 2/1991 | Shimizu et al. ..................... 428/36.7 |
| 5,004,647 | 4/1991 | Shah ...................................... 428/349 |
| 5,006,613 | 4/1991 | Shepherd et al. ..................... 525/444 |
| 5,024,850 | 6/1991 | Broer et al. ............................... 428/1 |
| 5,035,931 | 7/1991 | Yamada et al. ..................... 428/35.7 |
| 5,059,356 | 10/1991 | Nakamura et al. .................. 252/585 |
| 5,068,136 | 11/1991 | Yoshida et al. ..................... 428/35.7 |
| 5,084,352 | 1/1992 | Percec et al. ......................... 428/412 |
| 5,102,705 | 4/1992 | Yammoto et al. ................. 428/36.92 |

(List continued on next page.)

FOREIGN PATENT DOCUMENTS

| 0 275 077 | 7/1988 | (EP) . |
|---|---|---|
| 0 352 637 | 1/1990 | (EP) . |
| 0 503 065 | 9/1992 | (EP) . |
| 0 608 924 | 8/1994 | (EP) . |
| 0 763 423 | 3/1997 | (EP) . |
| 2091629 | 8/1982 | (GB) . |
| 2166685A | 5/1986 | (GB) . |
| 61-097603 | 5/1986 | (JP) . |
| 63-031729 | 2/1988 | (JP) . |
| 63-195602 | 8/1988 | (JP) . |
| 1-199841 | 8/1989 | (JP) . |
| 02220821A | 9/1990 | (JP) . |
| 2253919 | 10/1990 | (JP) . |
| 2253920 | 10/1990 | (JP) . |
| 2253950 | 10/1990 | (JP) . |
| 2253951 | 10/1990 | (JP) . |

(List continued on next page.)

OTHER PUBLICATIONS

Kirk–Othmer Encyclopedia of Chemical Technology, Third Edition, vol. 10, p. 216 (1980), Wiley–Interscience Publications, John Wiley & Sons, New York.

"Films, Multilayer," by W. Schrenk and E. Veazey, *Encyclopedia of Polymer Science and Engineering*, vol. 7, p. 106 (1980).

"Chain Folding in Thermotropic Polyesters" R.S. Irwin, *Macromolecules*, No. 26, pp. 7125–7133 (1993).

*Primary Examiner*—Vivian Chen
(74) *Attorney, Agent, or Firm*—Burns, Doane, Swecker & Mathis, L.L.P.

(57) ABSTRACT

Multilayer laminates including films, sheets, preforms, containers and other articles having at least one wholly aromatic, amorphous, stretchable liquid crystalline polymer layer with at least one non-liquid crystalline thermoplastic polyester layer are provided as well as methods for producing and stretching the multilayer articles. The laminates are suitable for thermoforming and stretch blow molding applications and may be stretched to at least 100 percent elongation at temperatures below 200° C. and at high total draw ratios without fractures or tears. Containers suitable for food or beverage products may be produced from the laminates.

38 Claims, No Drawings

U.S. PATENT DOCUMENTS

| | | | |
|---|---|---|---|
| 5,115,047 | 5/1992 | Hashimoto et al. | 525/444 |
| 5,132,147 | 7/1992 | Takiguchi et al. | 427/393.5 |
| 5,204,443 | 4/1993 | Lee et al. | 528/184 |
| 5,213,856 | 5/1993 | Po' et al. | 428/34.1 |
| 5,227,456 | 7/1993 | Shepherd et al. | 528/173 |
| 5,256,351 | 10/1993 | Lustig et al. | 264/22 |
| 5,261,545 | 11/1993 | Ota et al. | 215/1 C |
| 5,266,676 | 11/1993 | Po' et al. | 528/272 |
| 5,283,128 | 2/1994 | Wilhoit | 428/516 |
| 5,288,529 | 2/1994 | Harvey et al. | 428/1 |
| 5,303,834 | 4/1994 | Krishnakumar et al. | 215/1 C |
| 5,326,848 | 7/1994 | Kashimura et al. | 528/190 |
| 5,344,912 | 9/1994 | Dalgewicz, III et al. | 528/308.1 |
| 5,346,733 | 9/1994 | Dalgewicz, III et al. | 428/35.7 |
| 5,352,401 | 10/1994 | Dalgewicz, III et al. | 264/331.11 |
| 5,364,669 | 11/1994 | Sumida et al. | 428/1 |
| 5,405,565 | 4/1995 | Sumida et al. | 264/171 |
| 5,405,661 | 4/1995 | Kim et al. | 428/1 |
| 5,443,766 * | 8/1995 | Slat et al. | 264/37 |
| 5,445,784 | 8/1995 | Sugiura et al. | 264/521 |
| 5,460,861 | 10/1995 | Vicik et al. | 428/34.9 |
| 5,464,106 * | 11/1995 | Slat et al. | 215/12.1 |
| 5,512,625 | 4/1996 | Butterbach et al. | 524/490 |
| 5,534,209 | 7/1996 | Moriya | 264/171.13 |
| 5,589,236 | 12/1996 | Harvey et al. | 428/1 |
| 5,618,599 | 4/1997 | Nulman et al. | 428/36.7 |
| 5,628,957 | 5/1997 | Collette et al. | 264/512 |
| 5,656,714 | 8/1997 | Shen et al. | 528/193 |
| 5,672,296 | 9/1997 | Shen et al. | 252/299.01 |
| 5,738,803 | 4/1998 | Shepherd et al. | 252/299.01 |
| 5,738,918 | 4/1998 | Shen et al. | 428/1 |
| 5,744,204 | 4/1998 | Jester | 428/1 |
| 5,753,145 | 5/1998 | Teng et al. | 252/585 |
| 5,843,501 | 12/1998 | Rubin et al. | |
| 5,843,539 | 12/1998 | Harvey et al. | |
| 5,863,622 | 1/1999 | Jester | 428/1 |

FOREIGN PATENT DOCUMENTS

| | | |
|---|---|---|
| 2307751 | 12/1990 | (JP) . |
| 4135750 | 5/1992 | (JP) . |
| 5-169605 | 7/1993 | (JP) . |
| 5-177796 | 7/1993 | (JP) . |
| 5-177797 | 7/1993 | (JP) . |
| 08146219 | 6/1996 | (JP) . |
| 08216322 | 8/1996 | (JP) . |
| 2539382 | 10/1996 | (JP) . |
| 09131789 | 5/1997 | (JP) . |
| WO92/18568 | 10/1992 | (WO) . |
| WO93/24574 | 12/1993 | (WO) . |
| WO94/14350 | 7/1994 | (WO) . |
| WO95/08201 | 3/1995 | (WO) . |
| WO95/23063 | 8/1995 | (WO) . |
| WO95/23180 | 8/1995 | (WO) . |
| WO96/00752 | 1/1996 | (WO) . |
| WO 96/27492 | 9/1996 | (WO) . |
| WO96/27492 | 9/1996 | (WO) . |
| WO 96/38491 | 12/1996 | (WO) . |
| WO96/38743 | 12/1996 | (WO) . |
| WO96/38747 | 12/1996 | (WO) . |

* cited by examiner

MULTILAYER LAMINATE FORMED FROM A SUBSTANTIALLY STRETCHED NON-MOLTEN WHOLLY AROMATIC LIQUID CRYSTALLINE POLYMER AND NON-LIQUID CRYSTALLINE POLYESTER AND METHOD FOR FORMING SAME

FIELD OF THE INVENTION

This invention relates to multilayer laminates, including films, sheets, preforms, containers and other articles, comprising at least one layer of a wholly aromatic, amorphous, stretchable liquid crystalline polymer with at least one non-liquid crystalline polyester layer, and methods of producing and stretching such liquid crystalline polymers and such multilayer articles. The disclosures in this application are related to those in copending patent applications, Ser. Nos. 08/954,377, 08/954,378, 08/954,997 and 08/955,000, filed Oct. 20, 1997.

BACKGROUND OF THE INVENTION

Multilayer laminates, containers and other articles have numerous applications in industry, particularly for packaging applications. *Kirk-Othmer Encyclopedia of Chemical Technology*, Third edition, Volume 10, page 216 (1980), Wiley-Interscience Publication, John Wiley & Sons, New York, details generally the materials and processes required for making such articles as well as their applications. Another article of interest, for example, is "Films, Multilayer," by W. Schrenk and E. Veazey, *Encyclopedia of Polymer Science and Engineering*, Vol. 7, 106 (1980). Generally, such articles are prepared by coprocessing individual polymers in injection or extrusion operations or by laminating individually formed layers together or by a combination of these processes. Coprocessing as discussed herein refers to forming and/or subsequently processing at least two layers of polymeric material, each layer comprising a different polymeric material. Common polymers used in these applications include polyethylene, polypropylene, ethylene-vinyl acetate copolymer, ethylene-vinyl alcohol copolymer, ethylene-methyl acrylate copolymer, polyvinyl chloride, polyvinylidene chloride, polyamide, polyester, polycarbonate, polystyrene, acrylonitrile copolymers and the like. Desired properties in the laminates, films, sheets and the like, depend on the intended applications but generally include good mechanical properties such as tensile and impact strengths, processability, tear resistance, gas barrier properties, moisture barrier properties, optical properties, thermal and dimensional stability and the like.

U.S. Pat. No. 5,256,351 to Lustig et al and U.S. Pat. No. 5,283,128 to Wilhoit disclose biaxially stretched thermoplastic films from polyethylene and a process to prepare them. U.S. Pat. No. 5,460,861 to Vicik et al also teaches improved multilayer films from polyolefins. U.S. Pat. No. 4,911,963 to Lustig et at discloses an oriented multilayer film from nylon. U.S. Pat. No. 5,004,647 to Shah describes a coextruded multilayer film comprising ethylene-vinyl alcohol copolymer.

Many methods of forming useful articles from combinations of polymers require that all components of the combination be stretched, expanded or extended in one or more directions, or deformed in some other way, such as by folding, creasing and the like. This stretching, extending or other deformation may be carried out concurrently with the process of forming the laminate or individual layers from the melt or may be part of a subsequent forming operation. Deformation can also be a requirement of using the article. Such methods of forming include but are not limited to, uniaxial and biaxially stretching of extruded films, thermoforming of multilayer laminates, blowing of extruded or injection-molded tubes, stretch blow molding of preforms or parisons, creasing or folding of laminates to form boxes, twisting of films to form a wrapper and the like.

Combining layers of different polymers is a method generally used to form a multilayer laminate which takes advantage of the different properties which may be available in the different polymer layers while also minimizing the amount of the more expensive polymer used.

Many methods of container formation require the collapse of a tube or the folding of a multi-layer structure. In such cases, it is desirable to avoid wrinkles, to ensure that the various layers remain bonded to each other and to avoid fracturing or tearing one of the layers. Other methods of container formation require uniform stretching or expansion of the multilayer laminate at temperatures sufficient to stretch any polymeric material present in the laminate. It is advantageous to be able to coprocess the laminate, for example, to fold, stretch, expand or compress it without fracturing, tearing or otherwise destroying the integrity of any layer.

Thermotropic liquid crystal polymers are polymers which are liquid crystalline (i.e., anisotropic) in the melt phase. Other terms, such as "liquid crystal", "liquid crystalline" and "anisotropic" have been used to describe such polymers. These polymers are thought to possess a parallel ordering of their molecular chains. The state in which the molecules are so ordered is often referred to as either the liquid crystal state or the nematic phase of the liquid crystalline material. These polymers are prepared from monomers which are generally long, flat and fairly rigid along the long axis of the molecule.

Generally, liquid crystal polymers ("LCPs") have properties that are very desirable, such as excellent chemical resistance, high mechanical strength, and excellent gas, moisture and aroma barrier properties. It can be, however, difficult to heat-bond articles made of LCPs together or to other materials. It also may be difficult to write or print on articles made from LCPs.

LCPs are more expensive than conventional polyesters. Additionally several conventional LCPs even in the form of thin films do not possess high optical clarity. In general LCPs cannot be stretched or deformed more than a few percent unless they are heated to a processing temperature range of from about 200° C. to about 320° C., preferably from about 220° C. to about 300° C. Generally film and bottle formation processes require an excess of 100% elongation. For amorphous LCPs having no measurable melting point, this processing temperature range is referred to as the "molten state". In addition, in this temperature range where conventional LCPs can be deformed, they have very low melt strength and are weak. Tubes from conventional LCPs cannot be collapsed without wrinkling. Films or laminates containing one or more conventional LCP layers are difficult to fold without delamination and splitting. Preforms or parisons containing conventional LCP layers will have fractures or tears in the LCP layer unless they are heated to or are in the molten state before stretching, which may be far too high a temperature for coprocessing the other layers in the laminate.

U.S. Pat. No. 4,384,016 to Ide et at discloses that when polymers which exhibit anisotropic properties in the melt phase (i.e., thermotropic liquid crystal polymers) are extruded through a slit die and drawn in the melt phase, films and sheets which exhibit high machine direction properties are obtained. However, Ide et at recognizes that such films or sheets possess poor transverse directional properties which may limit their usefulness in certain structural applications and proposes laminating uniaxially oriented sheets at angles to one another to provide a multiaxially oriented sheet.

Stretching or drawing of the laminated, multiaxially oriented sheet proposed by Ide et al is not disclosed.

Another method for producing a multiaxially oriented liquid crystal polymer film is proposed by Harvey et at in U.S. Pat. No. 5,288,529 wherein axially flowing liquid crystal polymer material is subjected to transverse directional forces to strain the axial flow, and then the microscale structural orientation obtained is solidified to achieve a liquid crystal polymer film with nearly isotropic mechanical properties. Harvey et at proposes a process of shear orientation during extrusion to overcome the deficiencies in the mechanical properties of liquid crystal polymer films, which films are disclosed as being inadequate for certain applications because they can not be blown and drawn after extrusion as coil polymers (such as polyethylene terephthalate) can. More specifically, it is disclosed that liquid crystal polymer films which comprise relatively straight, or fibrillar, molecules become highly oriented in the die in the direction of extrusion and the flowing liquid crystal polymer becomes anisotropic, more so than ordinary coil polymers which tend to randomize. Because the liquid crystal polymer becomes highly oriented in the die anisotropically, it is disclosed that it may not be possible to stretch the polymer substantially in the direction transverse to its fibrillar orientation.

U.S. Pat. No. 5,534,209 to Moriya discloses that many of the physical properties of liquid crystal polymers are very sensitive to the direction of orientation of the liquid crystal regions in the polymer. This may be very desirable for linear products such as filaments and fibers, but anisotropic properties are often undesirable in products having a planar forms, such as tape, films, sheets and the like. Moriya also discloses that shear orientation processes such as those disclosed in Harvey et al have a drawback in that they are unable to make thin multiaxially oriented films without the formation of pinholes, tears and other imperfections. Moriya states that in the case of melt-processed thermotropic liquid crystal polymers which have very high processing viscosity, it is difficult to obtain films with uniform surface smoothness and thickness by shear orientation processes. This further increases the film's tear sensitivity as well as its susceptibility to curling and streaking.

Moriya obtains a liquid crystal polymer film having random orientation by feeding a thermotropic liquid crystal polymer into a melt region formed in the nip between opposed inward facing surfaces of two support membranes. The randomly oriented liquid crystal polymer film formed by the Moriya process may be multiaxially oriented by stretching the sandwich structure formed by the liquid crystal film and the two support membranes at or above the melting point of the liquid crystal polymer.

U.S. Pat. Nos. 5,364,669 and 5,405,565 to Sumida et al both disclose composite films comprising a layer of liquid crystal polymer having gas barrier properties, an adhesive layer, and a thermoplastic layer formed from thermoplastics such as polyalkylene terephthalates, olefin polymers, nylons, polycarbonates and the like. The composite films are suitable as a food packaging material. Sumida et al discloses that molten liquid crystal polymer may be biaxially stretched from the melt but should be extruded downward from the die to prevent the problems associated with low melt viscosity and weakness of the melted film which create difficulties when the molten liquid crystal polymer film is extruded upward from the die. Examples of the Sumida et al process are provided wherein Vectra® A900 (a trademark of Hoechst Celanese Corporation of Somerville, N.J.) wholly aromatic liquid crystal polyester resin is extruded at 290° C. at a blow ratio of 5.5 and a draft ratio of 6.0 to obtain a multiaxially oriented liquid crystal polymer film. Blow molding and stretch blow molding to obtain bottles or jars are not disclosed.

It is often desirable to obtain shaped articles from multilayer laminates by thermoforming and/or blow molding processes because they are cost effective methods of making mass produced shaped articles. However, such processes often are either not practical or not possible with materials that must be melt stretched, such as the wholly aromatic Vectra® liquid crystalline resins and other melt-processable liquid crystalline polymers utilized in the processes described above. Thus, it would be desirable to have a stretchable liquid crystalline polymer which may be stretched not only when in the molten state, but also at temperatures above the $T_g$ of the liquid crystalline polymer but below the molten state, or stretchable below about 200° C. Furthermore, it would also be desirable to have laminates and articles formed from such laminates comprising a layer of such a stretchable liquid crystalline polymer layer.

Often, copolymers or blends of different constituent polymeric materials are used to provide a combination of properties in the resulting copolymer or blend that none of the individual constituent polymeric materials possess by themselves. For example, it might be proposed to combine a melt-processable liquid crystalline material having excellent mechanical and gas barrier properties together with a thermoplastic polymeric material in an attempt to obtain a blend or copolymer having gas barrier properties, good mechanical properties and stretchability at lower temperatures.

However, it has been recognized that such combinations, prepared either as copolymers or blends, may exhibit what is termed a "negative synergistic effect". That is, even if the polymers are compatible in combination and form a copolymer or blend, the combination of polymers may have less desirable properties than would have been predicted. The exact mechanism for this effect is not fully understood, but often the properties in the copolymer or blend are closer to a combination of the least desirable properties of each individual constituent polymer, rather than the best properties of each. Even when good properties are obtained, the resultant polymeric material may have certain shortcomings.

U.S. Pat. No. 5,326,848 to Kashimura et al discloses thermotropic liquid crystal polyesters produced by a hybrid copolymerization process wherein polyesters such as polyethylene terephthalate (PET), polyethylene naphthalate (PEN), or copolymers of PET and PEN are combined with conventional liquid crystal polyester structural units based on hydroxy naphthoic acid and hydroxy benzoic acid, or units based on hydroxy naphthoic acid alone. Kashimura et al proposes to achieve both excellent formability and gas barrier properties and discloses laminates having layers of the liquid crystal polyester compositions with layers of other polymers such as polyesters, polyolefins and polyamides to produce laminated containers such as cups and bottles. A polyester composition capable of preparing formed shapes by deep drawing an unstretched sheet is disclosed as comprising PET combined with units based on hydroxy naphthoic acid and hydroxy benzoic acid. However, it is disclosed that the gas barrier property of this deep drawing composition may sometimes be inferior to the gas barrier properties obtained by the other compositions disclosed which are not disclosed as suitable for deep drawing. In all of the liquid crystal polyester compositions disclosed by Kashimura et al, an aliphatic dihydroxy component must be present in at least 15 mol percent in the liquid crystalline polyester. Although the formation of bottles and blow molding are disclosed, neither are demonstrated, nor are draw ratios for bottle formation or blow molding disclosed. Biaxial stretching of a film of the composition heated to 100° C. to 240° C. at a ratio of 3×3 is disclosed.

The processes disclosed by Kashimura et al for producing liquid crystalline polyester compositions consist of reacting a polymer such as PET, PEN or copolymers of these polyesters together with monomers based on hydroxy naphthoic acid and hydroxy benzoic acid or hydroxy naphthoic acid alone. This hybrid polymer/monomer copolymerization is necessitated by the requirement that at least 15 mol percent of the liquid crystalline polyester composition be an aliphatic dihydroxy component. This aliphatic component must be combined with the terephthalic acid and/or naphthalene dicarboxylic acid component before it is combined with the liquid crystal polyester monomeric moieties because it prevents the formation of the desired hybrid polymer. The process disclosed by Kashimura et al for producing such LCPs is highly variable and, therefore, difficult to develop into a full-scale commercial process to obtain liquid crystal polymer compositions in substantial quantities.

Stretchable multilayer laminates and articles comprising an LCP layer have been proposed. For example, JP 5,177,797 A discloses that multilayer containers may be prepared from a laminate comprising layers of a thermoplastic resin and an LCP. Other disclosures of similar nature and of interest include, for example, JP 5,177,796 A; JP 1,199,841 A; JP 5,169,605 A; and WO 9,627,492 A.

Pending application, Ser. No. 08/761,042, filed Dec. 5, 1996, discloses laminates comprising an LCP layer in the middle and peelable thermoplastic layers on the outside. Pending patent application, Ser. No. 081761,109, filed Dec. 5,1996, discloses polarizer laminates comprising dyed LCP layer in the middle and non-peelable thermoplastic layers on the outside. Pending applications, Ser. Nos. 08/954,377, 08/954,378, and 08/954,997 disclose adhesives for making multilayers at least one of those layers being from an LCP.

It would be desirable to produce stretchable LCPs and also to produce multilayer laminates or articles having one or more LCP layers bonded to one or more non-LCP layers to obtain a multilayer structure having the best properties of all of the various layers, such as a multilayer structure having good gas barrier properties, mechanical properties, optical properties and relatively low cost. It would be desirable for such liquid crystalline polymers and multilayer structures to be stretchable not only at temperatures where the LCP composition is in the molten state, but also at lower temperatures, above the $T_g$ of the LCP composition, but below the temperature range where the LCP composition is in the molten state. It would be desirable to be able to stretch such an LCP or LCP laminate more than once and achieve high draw ratios. It would be desirable to produce an LCP for such a laminate via a predictable, stable process, capable of use on a large commercial scale.

SUMMARY OF THE INVENTION

The present invention provides individual layers as well as multilayer laminates comprising a wholly aromatic, amorphous, low-temperature stretchable liquid crystalline polymer and a non-liquid crystalline thermoplastic polyester. The liquid crystalline polymer used in the present invention is described below and may be produced reproducibly and economically in full-scale commercial processes from suitable monomeric moieties and has excellent barrier properties. The liquid crystal polymer or polymers used in the invention may be stretched not only in their molten state, but also at temperatures greater than the $T_g$ of the liquid crystalline polymer composition but less than about 200° C. They may be stretched more than once, and may be stretched to a total area draw ratio greater than 10, or more preferably greater than 15 without fractures and/or tears.

The inventive laminates are useful to form multilayer films, sheets, preforms and parisons, and other articles with properties suitable for applications in many fields including, for example, food, cosmetic, chemical and industrial packaging applications. The inventive multilayer laminate exhibits no fractures and/or tears in any of layers of the laminates even when stretched to total area draw ratio greater than 15.

The present invention also provides processes to prepare such laminates, including films, sheets, preforms or parisons, or other articles.

The present invention also provides useful articles from laminates of the liquid crystalline polymer composition together with non-liquid crystalline thermoplastic polyesters.

DESCRIPTION OF THE INVENTION

Multilayer laminates including films, sheets, preforms, parisons, containers, and other similar articles ("articles" in general hereafter) have now been prepared from at least one layer of stretchable, wholly aromatic amorphous or "glassy" LCPs and at least one layer of non-liquid crystalline polyester. Individual layers of the stretchable LCP useful in the invention have also been prepared.

The multilayer laminates of the invention comprise at least one wholly aromatic, amorphous, stretchable liquid crystalline polymer layer and at least one thermoplastic, non-liquid crystalline polyester layer. The liquid crystalline polymer layer and laminates prepared from the liquid crystalline polymer layer of the invention are stretchable at temperatures below a molten state of the liquid crystalline polymer ("LCP"). The liquid crystalline polymer layer is obtained from the liquid crystalline polymer described below. The LCP layer of the invention is stretchable at temperatures below its molten state without the need for adding substantial amounts of non-LCP thermoplastic polymers, fillers or additives. However, there may be added amounts of non-LCP thermoplastic polymers, fillers or additives without adversely affecting the barrier or stretchability properties of either the LCP layer or the laminate of the invention. Exemplary amounts are up to about 10 mol percent total of added non-LCP thermoplastic polymers, fillers or additives, with the LCP suitable for the present invention comprising at least about 90 mol percent of the LCP layer. In other embodiments of the invention, the liquid crystalline polymer layer consists essentially of the liquid crystalline polymer. The liquid crystalline polymer is wholly aromatic in that each of the monomeric units that the liquid crystalline polymer is derived from are monomers which have no aliphatic components, as described further below.

The liquid crystalline polymer is amorphous in that it exhibits a glass transition temperature ($T_g$) but displays no melting point transition ($T_m$) under differential scanning calorimetry (DSC) analysis. In contrast, semi-crystalline liquid crystalline polymers exhibit both a $T_g$ and a $T_m$ under DSC analysis.

The liquid crystalline polymer composition used in the present invention has a processing temperature range in which it can be described as being in a molten state, that processing temperature range being from about 200° C. to about 320° C., or more preferably from about 220° C. to about 300° C. The liquid crystalline polymer compositions may be stretched not only in the molten state, but at temperatures below the molten state and above the $T_g$ of the liquid crystalline polymer composition. In the present invention, the liquid crystalline polymer compositions are stretchable to total area draw ratios of at least about 10, more preferably at least about 15, without the appearance of any fractures or tears in any layer of the laminate.

The liquid crystalline polymers used in the multilayer articles described herein are wholly aromatic polymers, with relatively linear structures, which exhibit liquid crystalline behavior in the molten phase. They include, but are not limited to, wholly aromatic amorphous polyesters or wholly aromatic amorphous polyesteramides. In embodiments of the invention, the liquid crystalline polymers preferably comprise repeat units which, as described in U.S. Pat. No. 5,672,296, incorporated herein by reference in its entirety, correspond to the general formula:

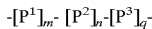

$$-[P^1]_m- [P^2]_n-[P^3]_q-$$

wherein $P^1$ is an aromatic hydroxy carboxylic acid or an aromatic amino carboxylic acid; $P^2$ is an aromatic dicarboxylic acid; $P^3$ is a phenolic compound; m, n and q represent mole percent of the respective monomers ranging generally from 5 to 70 percent individually. The preferred range of m is about 5 to 40 percent, n is about 5 to 40 percent and q is about 5 to 40 percent. In addition to $P^1$, $P^2$ and $P^3$, additional monomeric moieties such as, for example, a second aromatic hydroxy carboxylic acid moiety or an aromatic amino carboxylic acid moiety -[$P^4$]$_r$- and a diphenol moiety -[$P^5$]$_s$ may be part of the polymer repeat unit, in which case r is about 5 to 20 mole percent, and s is about 5 to 20 mole percent. $P^4$ is different from $P^1$ and $P^5$ is different from $P^3$. Still additional monomers may also be present such as, for example, phenyl hydroquinone, methyl hydroquinone and the like. In the above general formula, the monomers $P^1$ and $P^4$ are selected from the group consisting of 4-hydroxybenzoic acid, 2-hydroxy-6-naphthoic acid, 4-aminobenzoic acid, and 4-carboxy-4'-hydroxy-1,1'-biphenyl. 4-Hydroxybenzoic acid is preferred. $P^2$ may be terephthalic acid, isophthalic acid, phthalic acid, 2-phenylterephthalic acid, 1,2-naphthalenedicarboxylic acid, 1,4-naphthalenedicarboxylic acid, 2,6-naphthalene dicarboxylic acid and 4,4'-biphenyldicarboxylic acid; terephthalic acid is preferred. $P^3$ is selected from the group consisting of resorcinol, hydroquinone, methyl hydroquinone, phenyl hydroquinone, catechol and 4,4'-dihydroxybiphenyl; 4,4'-dihydroxybiphenyl is preferred. $P^5$ is a diphenol selected from resorcinol, hydroquinone, catechol, 4,4'-dihydroxybiphenyl and bisphenol-A.

In preferred embodiments of the invention, the liquid crystalline polymer more preferably comprises a wholly aromatic thermotropic liquid crystal polyester which comprises the following five monomeric units: 4-hydroxybenzoic acid, 6-hydroxy-2-naphthoic acid, terephthalic acid, 4,4'-dihydroxybiphenyl and resorcinol, in a molar ratio 30:30:20:10:10 respectively (referred to as COTBPR hereafter). COTBPR is disclosed in U.S. Pat. No. 5,656,714 to Shen et al incorporated herein by reference in its entirety. Although particularly preferred, COTBPR is only one of many various wholly aromatic, amorphous, stretchable liquid crystalline polyester compositions disclosed therein which may be suitable in the practice of this invention. Shen et al also discloses semi-crystalline wholly aromatic liquid crystalline compositions which are not suitable in the practice of this invention. Examples of both amorphous and semi-crystalline compositions are listed in Table I of the aforementioned U.S. Pat. No. 5,672,296.

The multilayer structures of this invention comprise at least one layer of the above-described wholly aromatic, amorphous, stretchable LCP. The other layer or layers may comprise non-liquid crystalline polyesters. As discussed above, thermotropic liquid crystalline polyesters are polymers which are liquid crystalline, (i.e., anisotropic) in the melt phase. Non-liquid crystalline polyesters are defined as polymers which are not liquid crystalline in the melt phase. In other words, they are isotropic in the melt phase. Examples of the non-liquid crystalline polyesters used for preparing the multilayer structures of the invention include, but are not limited to, polyethyleneterephthalate, polyethyleneisophthalate, polyethylene-2,6-naphthalate, polybutyleneterephthalate, polypropyleneterephthalate, copolyesters where the diacid component can be terephthalic acid and derivatives thereof, isophthalic acid and derivatives thereof, 1,2-, 1,3-, 1,4-, 1,5-, 1,6-, 1,7-, 1,8-, 2,3-, 2,4-, 2,5-, 2,6-, 2,7, 2,8-, isomers of naphthalene dicarboxylic acid and derivatives thereof, 4,4'-biphenyl dicarboxylic acid and derivatives thereof, 4,4'-diphenylether dicarboxylic acid and derivatives thereof, stilbenedicarboxylic acid and derivatives thereof, linear and mono and bis cyclic aliphatic dicarboxylic acids of 5–12 carbon atoms and derivatives thereof, copolyesters where the diol component can be a linear aliphatic diol of 2–12 carbon atoms and derivatives thereof, 2-methyl-propanediol, 2,2'-dimethylpropanediol, cyclohexanediol, cyclohexanedimethanol, 1,3-bis(2-hydroxyethoxy)benzene and derivatives thereof, 1,4-bis(2-hydroxyethoxy)benzene and derivatives thereof, bis(4-beta-hydroxyethoxyphenyl)sulfone and derivatives thereof, diethyleneglycol, poly(ethylene) glycol, poly(propylene) glycol, poly(tetramethylene) glycol, as well as structural units derived from polyhydric alcohol such as glycerol trimethylolpropane triethylpropane or pentaerythritol (within an amount that melt processing of the polyester will not be affected), blends of the above polyester and copolyester compositions, post consumer recycled PET as well as its mixtures. PET is preferred due to its high availability. In the multilayer laminates of the invention, the non-liquid crystalline polyester may comprise monomeric residues selected from the group consisting of terephthalic, isophthalic and naphthalene dicarboxylic moieties, and mixtures thereof. The non-liquid crystalline polyester may also comprise monomeric residues selected from the group consisting of ethylene glycol, propylene glycol and butylene glycol moieties and mixtures thereof.

Laminates and other articles comprising the LCPs and non-polyester thermoplastics such as polyolefins are also desirable and are the subject of copending patent application, Ser. No. 08/955,000, filed Oct. 20, 1997.

The liquid crystalline polymer layer and the multilayer laminates of the present invention have good stretchability in both the machine direction ("MD") and the transverse direction ("TD") at various temperatures. They may be stretched uniaxially in either direction, MD or TD, or biaxially either sequentially or simultaneously, or stretched or expanded into a mold. The laminates of the present invention have excellent mechanical, optical and barrier properties. Generally, an adhesive is not necessary to bind the layers of the laminate. However, if one is desired, copending applications stated above and filed of even date herewith describe adhesives useful for such applications. Such an adhesive may also be coextruded as an additional layer in the same process.

In embodiments of the invention, several different processes may be used to prepare the LCP layer of the invention or the multilayer laminates of the invention which may comprise two, three, four, five or more layers. The order of the individual layers in the laminate as well as the nature of the inner layers and outer layers in the laminate may be chosen according to the application desired and equipment used. Such variations are well known to those skilled in the art. The laminate may additionally contain other optional layers such as, for example, a heat sealing layer, a FDA approved food contact layer, an adhesive layer, a colored layer, an ultraviolet blocking layer, an oxygen scavenging layer and a layer containing regrind or recycle materials. Such layers may also be coextruded in the same process described above or may be subsequently added separately. Additionally, one or more of the layers, including coextruded layers containing the LCP, may be extrusion coated onto other layers, including, for example, aluminum foil, paperboard, or steel.

In general, the process of forming a layer of the wholly aromatic, amorphous, low-temperature stretchable liquid crystalline polymer may be any suitable means of processing a thermotropic LCP. Such methods of forming a layer of the LCP include, but are not limited to, injection molding, extrusion, compression molding, or coating onto a substrate. In preferred embodiments of the invention a central layer of the LCP is coextruded between two outer protective layers which are later removed to form a thin, smooth single layer of the LCP. Layers of LCP may be formed as thin as 0.5 mil by this method.

Processes of forming a laminate comprising at least one layer of the LCP useful in the invention and at least one layer of non-liquid crystalline polyester may be any suitable means for combining two or more layers of thermoplastic polymer to form a laminate. Three general categories of laminate forming methods are exemplary, but not exhaustive, of possible methods of laminate formation. The first category is combining two polymer layers before they solidify, i.e., when they are both in the molten state. Extrusion methods such as feedblock coextrusion or multi-manifold coextrusion are examples of such a method and are both acceptable ways of forming the laminate according to the invention. Another category is combining an unsolidified, i.e., molten polymer layer with a solidified polymer layer. Processes such as extrusion coating and extrusion lamination are in this category and are suitable for forming the laminates of the invention. Combining solidified layers is the third general laminate forming category and lamination and certain coating processes are suitable for forming the laminate of the invention in this manner.

In an exemplary process, an LCP suitable for the invention and a suitable non-liquid crystalline polyester are coextruded simultaneously in a conventional coextrusion process using a feedblock to combine the polymer streams right at the die exit. The polymer streams join together while they are still above the melting point, resulting in a multilayer film exiting the die. The multilayer laminates of the present invention may also be extruded in planar, tubular, or other configurations. Also, a tubular laminate may be coextruded and slit or otherwise opened to form a planar coextrudate.

The multilayer laminates of the present invention may be stretched during extrusion, subsequent to extrusion, or both during and subsequent to extrusion. The tubular multilayer laminate may also be formed from the multilayer laminates of the present invention by spiral winding. Other suitable processes such as, for example, compression or injection molding, may also be used to produce the laminates of the present invention including films, sheets, preforms, parisons and other articles.

The multi-layer structures may be formed into articles by suitable methods. The LCP layer and the LCP-containing multilayer laminates of the invention possess properties ideally suited for thermoforming, blow molding and other methods of mass producing shaped articles with the use of heat and stretching. Such processes are well known to those skilled in the art. The various techniques by which film or sheet may be formed into useful articles are described in such works as James L. Throne, "Thermoforming," (Hanser Publishers, New York, 1987) which is incorporated herein by reference. Similarly, if the LCP-containing inventive laminates are coextruded in the form of a tube or parison, then these are ideally suited for blow molding. The various blow molding techniques, such as extrusion blow molding, injection blow molding, stretch blow molding, and the like, are described, for example, in Donald V. Rosato and Dominick V. Rosato, editors, "Blow Molding Handbook," (Hanser Publishers, 1988). Such parisons suitable for various blow molding processes can also be produced by injection-molding or co- injection molding as is well-known to those skilled in the art. In addition, a container can be formed by a combination of these processes, for example, extruding a multi-layer parison containing a layer of the LCP, extrusion-blow- molding this parison to form a shaped insert, injection molding a polyester, such as polyethyleneterephthalate or the like, around the outside of this insert to form a preform, and finally stretch-blow molding the preform to form a bottle, jar or other container. Alternatively, the multi-layer insert can be produced by thermo-forming a planar sheet. These insert-molding processes are described, for example, in U.S. Pat. No. 5,443,766 to Slat et al and U.S. Pat. No. 5,464,106 to Slat et al, the disclosures of which are hereby incorporated by reference in their entireties. Such stretch-blown containers are useful for a variety of packaging applications such as for foods, beverages, cosmetics, chemicals and industrial products.

In the method of stretching the LCP layer or the multilayer laminate comprising at least one layer of LCP according to the present invention, the LCP layer or the multilayer laminate comprising at least one wholly aromatic, amorphous, stretchable liquid crystalline polymer layer and at least one thermoplastic, non-liquid crystalline polyester layer is formed. The multilayer laminate may be stretched at a temperature below a molten state of the liquid crystalline polymer as well as at a temperature within the molten state of the liquid crystalline polymer. In the method according to the invention, the multilayer laminate may be heated, prior to stretching, to a temperature above the $T_g$ and below the molten state of the liquid crystalline polymer. In the method of the present invention, the multilayer laminate may be stretched by various thermoforming methods including, but not limited to, vacuum forming, plug assist thermoforming, compression molding and the like. The multilayer laminate of the present invention may be formed by coextruding the individual layers or by forming the layers separately and laminating them together, or by any other acceptable method of forming the laminate.

The multilayer laminate may be stretched by thermoforming into a shape having an innermost surface and an outermost surface. In addition, the thermoformed laminate may then be placed in a mold, and thermoplastic material may be injected into the mold to form an outer layer in contact with the outermost surface of the thermoformed laminate.

In other embodiments of the invention, the liquid crystalline polymer layer and the non-liquid crystalline polyester layer may be formed either individually or together by coating onto a substrate. The coating method may be extrusion coating, dispersion coating, solvent coating, or any other acceptable coating method. The multilayer laminate may be applied in coating form to a substrate such as paperboard, aluminum or steel. The substrate may be subsequently stretched or deformed to form a package, container, or other coated articles.

In other embodiments of the invention, the multilayer laminate of the invention may be in the form of a stretchable multilayer preform for blow molding. The method of producing such a stretchable multilayer preform for blow molding according to the invention comprises the steps of forming a first layer having an inner surface, an outer surface, an open end and an opposite end, and comprising a thermoplastic non-liquid crystalline polyester. A second layer having an inner surface, an outer surface, an open end and an opposite end is also formed. The second layer comprises a wholly aromatic, amorphous, stretchable liquid crystalline polymer. The preform is stretchable at a temperature below a molten state of the liquid crystalline polymer, and the inner surface of one of the layers is in contact with the outer surface of the other layer, and the open ends and closed ends of both layers are coincident. The layers of the preform may be formed by extrusion or injection molding, or by any other suitable process for manufacturing the multilayer stretchable preform of the invention. The stretchable multilayer preform of the invention may be expanded into a mold to form a container by methods such as blow molding, stretch blow molding, biaxial stretch blow molding, and the like.

Additionally, individual layers or multilayer laminates coextruded in the form of a tube or a parison can be collapsed and sealed at one or both ends to form a tube, a bag or a pouch. Optionally, one or more dispensing devices or orifices can be inserted. In addition, the collapsing and folding can be carried out in such a way as to form a so-called stand-up pouch. Such formed articles are ideally suited for various packaging applications, including containers for food, beverages, cosmetics, chemicals, pesticides and automotive, or various solid articles requiring the protection afforded by such a package. Tubes, bags and pouches can also be formed from such planar multi-layer films by well-known techniques of seaming and sealing or spiral-winding and the like.

The films, sheets, laminates, cups, tubs, trays, pails, bottles, jars, bags, pouches, tubes and boxes and the like formed by the above methods as well as others well-known to skilled artisans may, in some cases, possess a degree of transparency when compared with other known LCPs. Optionally, the articles can be made translucent or opaque, using well-known techniques, such as coatings, printing or pigmentation of one or more layers and the like.

Useful containers can also be formed from multi-layer structures obtained by extrusion-coating one or more polymeric layers, including at least one layer of the LCP, onto another already formed substrate. Such a substrate may be formed from one or more polymers, or from one or more metallic layers or from cellulosic layers, such as paperboard, or combinations of the foregoing. Such multi-layer structures can then be formed into containers by folding or otherwise deforming the structure and forming the appropriate seals to close the structure. Typical containers formed by such processes include boxes or tubes of various shapes and sizes and the like, which may optionally be equipped with some type of opening device or dispensing orifice. Such containers are widely used for various packaging applications, especially for the aseptic packaging of foods and beverages.

The polymers and processes described herein and used to form the laminates of the present invention are not limiting in any way as to the thicknesses of the various layers in the laminates. Also, the individual layers may have the same or different thicknesses; the equipment is chosen accordingly. Such methods are well known to the skilled artisan.

The multilayer laminates as well as the articles described herein possess excellent combination of mechanical, optical and thermal properties, in addition to high barrier properties to oxygen and moisture, as well as chemical resistance and the ability to be printed or decorated, to make them ideally suitable for applications as, for example, food and beverage containers, cosmetics packages, drug packages, solvent storage containers, chemical containers, gas tanks and the like or for packaging a variety of consumer and industrial products. The amorphous, wholly aromatic, stretchable LCPs can be used in such thicknesses within the given article of the present invention to be cost-effective even though they may themselves have a somewhat higher initial cost.

The following Examples are provided in order to further illustrate the invention. The scope of the invention, however, is not to be considered limited in any way thereby.

EXAMPLES

Example 1

Coextrusion of Multilayer Film Comprising Three Layers:

PET resin available under the brand name designation "T80" bottle resin available from Hoechst Trevira, a Hoechst group company, Charlotte, N.C., was fed into a 3.5 inch diameter, single screw extruder and exited the extruder at final melt temperature of 270° C. At the same time, a wholly aromatic, amorphous, thermotropic liquid crystalline polyester comprising the following five monomeric units: 4-hydroxybenzoic acid, 6-hydroxy-2-naphthoic acid, terephthalic acid, 4,4'-dihydroxybiphenyl and resorcinol, in a molar ratio 30:30:20:10:10, respectively (COTBPR) was fed into a single screw extruder having a two inch diameter screw and exited the extruder at a final melt temperature of 285° C. Both melt streams were fed to a Cloeren five-layer MBM combining block supplied by Cloeren of Orange, Texas. The Cloeren combining block was mounted on an EDI single slit die (from Extrusion Die Incorporated, Chippewa Falls, Wis.). The molten polymer streams were delivered to the feed block where the polymer flows were divided, the PET flow being divided into the A channels of the feed block, and the LCP flow being fed into the B channel of the feed block. The streams were combined so that they emerged from the die lips as a multilayer laminate. The resultant multilayer laminate structure impinged on a chill roll and was taken up on a roll winder. During the extrusion process, the overall thickness of the extruded film was continuously monitored by a beta gauge located after the chill roll. A multilayer film having the following three layer structure (from top to bottom) was produced: PET, 6.5 mil/COTBPR, 3 mil/PET, 6.5 mil.

Example 2

Uniaxial and Biaxial Stretching Experiments:

Seven samples of the PET/COTBPR/PET coextruded film described in Example 1 were also stretched both uniaxially and biaxially on a Bruckner Stretching Frame Model Karo II (from Bruckner Maschinenbau, Tittmoning, Germany) having gripping means, infrared heating means, and dual digital drives. The stretching frame received 6" transverse direction (TD) by 6" machine direction (MD) samples. The film samples were heated by an infrared heating system. The film surface temperature was measured by an infrared pyrometer and drawing was initiated when the film reached the set drawing temperature indicated in Table I. Table I summarizes the results of these drawing trials. In Table I, draw ratio is the ratio of film length after stretching to the initial length. When the film was stretched biaxially, the overall draw ratio was the product of TD and MD linear draw ratios. The above-described PET/COTBPR/PET coextruded films showed good drawability both uniaxially and biaxially (both in the machine direction (MD) and transverse direction (TD)) at various temperatures. For example, by uniaxial stretching at 145° C., a draw ratio of 5×1 in the machine direction was achieved and with 3×3 biaxial stretching at 135° C. and 145° C. a total draw ratio of 9 was achieved. Layer to layer thickness uniformity for the layers was good as was transparency and general aesthetics. The films showed good layer to layer adhesion. Orientation on a molecular level was confirmed by performing wide angle x-ray diffraction measurements on the uniaxially drawn films. Oxygen transmission measurements were performed at 23° C. according to both ASTM 3985 and DIN 53380 Part 3, using an OxTran 100 instrument from Modern Controls Incorporated, North Minneapolis, Minn.

TABLE I

| Run # | Drawing Temp. [C.] | Draw Ratio TD | Draw Ratio MD | Overall Draw Ratio | Oxygen Transmission Rate* |
|---|---|---|---|---|---|
| 1 | 125 | 3 | 2 | 6 | 0.195 |
| 2 | 135 | 3 | 2 | 6 | 0.218 |
| 3 | 135 | 3 | 3 | 9 | 0.211 |
| 4 | 145 | 3 | 3 | 9 | 0.287 |
| 5 | 145 | 1 | 3 | 3 | |
| 6 | 145 | 1 | 4 | 4 | |
| 7 | 145 | 1 | 5 | 5 | |

*units in: cc/100 sq inch day atm

Example 3
Uniaxial Stretching of Multilayer Films:

The same Bruckner stretching unit from Example 2 was used to uniaxially stretch samples prepared from the same stretchable COTBPR used in Example 1. The COTBPR layer was the central layer in a multilayer laminate structure having 10 mil layers of polyethylene terephthalate-isophthalate copolymer comprising 17.5 weight percent isophthalic acid units and the balance of the dicarboxylic acid units being terephthalic acid on either side of the COTBPR layer. This 17.5 weight percent isophthalic acid copolymer (hereinafter designated "PETIP") was extruded together with the COTBPR in the same manner and with the same equipment as described in Example 1. Two different thicknesses of COTBPR were used as central layers, 1 mil and 5 mil, resulting in two different multilayer laminates. The first multilayer laminate comprised: 10 mil PETIP/1 mil COTBPR/10 mil PETIP, the second multilayer laminate comprised: 10 mil PETIP/5 mil COTBPR/10 mil PETIP. The two different laminates were stretched at three different draw temperatures at a 2.5 draw ratio in the extrusion machine direction (MD). The transverse direction was held at a constant width. The samples were heated with infrared heaters and the film surface temperature was monitored by an infrared pyrometer. When the desired draw temperature was reached as indicated in Table II, the drawing sequence was initiated with a draw speed of 1.25 inches per second. Layer to layer thickness uniformity for the layers was good with no fractures in the COTBPR layer observed. Full uniform stretching, i.e., homogeneously decreasing the original thickness of the LCP layer across the entire expanse of the stretched laminate, was achieved in all of the samples.

TABLE II

| Run # | COTBPR Layer Thickness [mil] | Drawing Temp. [° C.] | Draw Ratio TD | Draw Ratio MD | Comments |
|---|---|---|---|---|---|
| 1 | 1 | 125 | 1 | 2.5 | Full uniform stretching |
| 2 | 5 | 125 | 1 | 2.5 | Full uniform stretching |
| 3 | 1 | 135 | 1 | 2.5 | Full uniform stretching |
| 4 | 5 | 135 | 1 | 2.5 | Full uniform stretching |
| 5 | 1 | 145 | 1 | 2.5 | Full uniform stretching |
| 6 | 5 | 145 | 1 | 2.5 | Full uniform stretching |

Comparative Example:
Uniaxial Stretching of Multilayer Films:

The Bruckner same stretching unit from Example 2 was used to uniaxially stretch samples of a 2 mil Vectran® FA film within a multilayer structure having a 10 mil PETIP layer as in Example 3 on either side of the Vectran® FA film. Vectran® FA is a film produced from Vectra® A950 wholly aromatic LCP resin (available from Hoechst Ticona, a Hoechst group company, Summit, N.J.). The multilayer laminate was produced on the same equipment and in the same manner as Example 1. Four draw temperatures at a 2.5 draw ratio in the extrusion machine direction were used. The transverse direction was held at constant width. The samples were heated with infrared heaters and the film surface temperature was monitored by an infrared pyrometer. When the desired draw temperature as indicated in Table III was reached, the drawing sequence was initiated with a draw speed of 1.25"/sec. At all drawing temperatures up to 175° C. the Vectran@ layer fractured as soon as drawing was initiated. Higher drawing temperatures could not be achieved because the PETIP layers began to melt.

TABLE III

| Run # | COTBPR Layer Thickness [mil] | Drawing Temp. [° C.] | Draw Ratio TD | Draw Ratio MD | Comments |
|---|---|---|---|---|---|
| 1 | 1 | 125 | 1 | 2.5 | Brittle Break of Vectran ™ layer with no stretching possible |
| 2 | 2 | 135 | 1 | 2.5 | Brittle Break of Vectran ™ layer with no stretching possible |
| 3 | 2 | 145 | 1 | 2.5 | Brittle Break of Vectran ™ layer with no stretching possible |
| 4 | 2 | 175 | 1 | 2.5 | Brittle Break of Vectran ™ layer with no stretching possible |

Example 4
Stretch Blow Molding Multilayer Bottles:

A three-step process was used to form a 12 oz. multilayer container. In the first step a three-layer preform insert was produced by a coextrusion blow molding process using an apparatus comprising a 1½" screw diameter Arburg press and a 15 mm screw diameter BOY 15 press (from Boy Machines Corporation, Exton, Pennsylvania) connected to a multilayer flow combining head with a circular nozzle which delivered a ½ inch diameter tubular parison to a single cavity mold. The mold was closed on the parison to pinch off both ends of the parison. The parison was then inflated to form an insert. The multi-layer insert was trimmed to a length of 3⅜ inches and a diameter of 0.68 inches in the section destined for the bottle wall. The three layers were of generally equal thickness such that COTBPR central layer was about 0.008 and located substantially centrally in the 0.025 inch wall thickness. The inner and outer layer of the three layer insert consisted of T98 PET bottle resin, modified with 10 percent isophthalic acid, supplied by Hoechst Trevira. The COTBPR resin had a melt viscosity of 5,680 poise at 270° C. The three layer insert was placed in an Arburg molding press and overmolded with an 0.14 inch layer of injected 86H PET bottle resin (available from Hoechst Trevira) to form a preform. The preform was then stretch blow molded in a Sidel multi-station stretch blow molding machine to form a 12 oz. container having a uniform COTBPR layer throughout the polyester walls and having good transparency. The COTBPR layer thickness in the wall area measured 0.0013 inches as compared to the 0.008 inch thickness in the original insert from which it was formed. These thickness measurements indicated a total area draw ratio of 6.67 for the stretchable COTBPR in the container.

Example 5

Thermoforming Followed by Stretch Blow Molding:

Multilayer sheets from Example 3 having 10 mil PETIP polyester on either side of a 5 mil thick central COTBPR layer were cut in 7 by 7 inch pieces. These multilayer sheets were then thermoformed at 145° C. to form an insert. Average insert thickness after thermoforming was 20.16 mils indicating an average draw ratio of 1.24. The inserts were placed over the core of an injection molding machine and overmolded with polyester bottle resin Polyclear® N10 (available from Hoechst Trevira), modified with 10 weight percent naphthalene dicarboxylic acid. In the overmolding step, molten N10 resin was injected onto the outer surface of the three layer thermoformed insert, to form a four layer preform having the structure N10/PETIP/COTBPR/PETIP. The preforms were then reheated up to 145° C. and stretch blowmolded into a 500 ml wide mouth container having a uniform COTBPR layer without fractures or tears throughout the wall section and good transparency. The COTBPR layer thickness in the wall area measured 0.45 mi. This thickness measurement indicates a total area draw ratio of 11.1 for the COTBPR layer in the container.

What is claimed is:

1. A multilayer laminate comprising (a) at least one layer of wholly aromatic liquid crystalline polymer which is stretchable at a temperature below 200° C., and (b) at least one layer of non-liquid crystalline polyester, wherein said multilayer laminate was stretched to at least 100 percent elongation while at a temperature below 200° C. and below the temperature of the molten state of said layer (a) of wholly aromatic liquid crystalline polymer so as to achieve molecular orientation in layer (b).

2. The multilayer laminate of claim 1 wherein said stretched wholly aromatic liquid crystalline polymer layer (a) is a polyester and has repeat units corresponding to the formula:

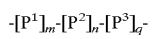

wherein $P^1$, $P^2$ and $P^3$ represent residues of monomeric moieties, with $P^1$ being an aromatic hydroxy carboxylic acid, $P^2$ being an aromatic dicarboxylic acid, and $P^3$ being a phenolic compound; and m, n and q represent mole percent of the respective monomers with m, n, and q being about 5–40 percent individually.

3. The multilayer laminate of claim 2, wherein said stretched wholly aromatic liquid crystalline polymer layer (a) additionally contains repeat units of monomeric moieties $[P^4]_r$, and $[P^5]_s$, where $[P^4]_r$ is a second aromatic hydroxy carboxylic acid moiety different from $P^1$, and $[P^5]_s$ is a phenolic moiety different from $P^3$, with r and s representing the mole percent of the respective monomers, r being about 5–30 mole percent, and s being about 5–20 mole percent.

4. The multilayer laminate of claim 3, wherein $P^1$ is 4-hydroxybenzoic acid, $P^2$ is terephthalic acid, $P^3$ is 4,4'-dihydroxybiphenyl, $P^4$ is 6-hydroxy-2-naphthoic acid, and $P^5$ is resorcinol; and m is 5 to 40, n is 5 to 40, q is 5 to 40, r is 5 to 30, and s is 5 to. 10 percent.

5. The multilayer laminate of claim 3, wherein $P^1$ is 4-hydroxybenzoic acid, $P^2$ is terephthalic acid, $P^3$ is 4,4'-dihydroxybiphenyl, $P^4$ is 6-hydroxy-2-naphthoic acid, and $P^5$ is resorcinol; and m is 30, n is 20, q is 10, r is 30, and s is 10 percent.

6. The multilayer laminate of claim 1, wherein said layer of non-liquid crystalline polyester (b) comprises monomeric residues selected from the group consisting of terephthalic acid, isophthalic acid, naphthalene dicarboxylic acid, ethyleneglycol, propylene glycol, and butylene glycol moieties, and mixtures thereof.

7. The multilayer laminate of claim 1, wherein said layer of non-liquid crystalline polyester (b) is selected from the group consisting of polyethyleneterephthalate; polyethyleneisophthalate; polyethylene-2,6-naphthalate; polybutyleneterephthalate; polypropyleneterephthalate; post consumer recycled polyethylene terephthalate; copolyesters where the diacid component is terephthalic acid and derivatives thereof, isophthalic acid and derivatives thereof, 1,2-, 1,3-, 1,4-, 1,5-, 1,6-, 1,7-, 1,8-, 2,3-, 2,4-, 2,5-, 2,6-, 2,7, 2,8-isomers of naphthalene dicarboxylic acid and derivatives thereof, 4,4'-biphenyl dicarboxylic acid and derivatives thereof, 4,4'-diphenylether dicarboxylic acid and derivatives thereof, stilbenedicarboxylic acid and derivatives thereof, linear and mono and bis cyclic aliphatic dicarboxylic acids of 5–12 carbon atoms and derivatives thereof; copolyesters where the diol component is a linear aliphatic diol of 2–12 carbon atoms and derivatives thereof, 2-methyl-propanediol, 2,2'-dimethylpropanediol, cyclohexanediol, cyclohexanedimethanol, 1,3-bis(2-hydroxyethoxy)benzene and derivatives thereof, 1,4-bis(2-hydroxyethoxy)benzene and derivatives thereof, bis(4-beta-hydroxyethoxyphenyl) sulfone and derivatives thereof, diethyleneglycol, poly (ethylene) glycol, poly(propylene) glycol, poly (tetramethylene) glycol, glycerol and derivatives thereof, trimethylolpropane and derivatives thereof, triethylolpropane and derivatives thereof, pentaerythritol and derivatives thereof; and combinations and blends thereof.

8. The multilayer laminate of claim 1, wherein said wholly aromatic liquid crystalline polymer layer (a) and said non-liquid crystalline polyester layer (b) are coextruded to form the multilayer laminate, and subsequently are stretched while at a temperature below 200° C. and below that of the molten temperature of (a) to at least 100 percent elongation.

9. The multilayer laminate of claim 8, wherein said coextruded laminate was subsequently expanded into a mold with said stretching.

10. The multilayer laminate of claim 8, wherein said coextruded laminate was subsequently blown to produce said stretching.

11. The multilayer laminate of claim 1, wherein said laminate has been stretched while at a temperature below 200° C. and below that of the molten temperature of (a) to at least 100 percent elongation by a method selected from the group consisting of uniaxial stretching, multiaxial stretching, and blowing into a mold.

12. The multilayer laminate of claim 1, wherein said laminate is in a form selected from the group consisting of planar, tubular, spiral wound, and planar formed by the opening of a tubular laminate.

13. The multilayer laminate of claim 1, wherein said laminate following its formation is thermoformed into a shape.

14. A container formed from the multilayer laminate of claim 1 wherein said container is selected from the group consisting of a thermoformed container, an injection blow-molded container, an extrusion blow-molded container, and a stretch-blow molded container.

15. A container formed from the multilayer laminate of claim 1 wherein said container is selected from the group consisting of a bag, a pouch, and a tube.

16. The container of claim 15 wherein said container is in the form of a tube and one or both ends have been closed.

17. The container of claim 15 wherein the container is formed by folding over and sealing a planar laminate to form a tube and closing one or more ends of the tube.

18. A container formed from the multilayer laminate of claim 1 wherein said container is selected from the group consisting of a box and a can.

19. A container formed from the multilayer laminate of claim 1 wherein said stretched wholly aromatic liquid crystalline polymer layer (a) is a polyester and has repeat units corresponding to the formula:

-[P$^1$]$_m$-[P$^2$]$_n$-[P$^3$]$_q$- wherein P$^1$, P$^2$ and P$^3$ represent residues of monomeric moieties, with P$^1$ being an aromatic hydroxy carboxylic acid, P$^2$ being an aromatic dicarboxylic acid, and P$^3$ being a phenolic compound; and m, n and q represent mole percent of the respective monomers with m, n, and q being about 5–40 percent individually.

20. A container formed from the multilayer laminate of claim 19, wherein said stretched wholly aromatic liquid crystalline polymer layer (a) additionally contains repeat units of monomeric moieties [P$^4$]$_r$ and [P$^5$]$_s$, where [P$^4$]$_r$ is a second aromatic hydroxy carboxylic acid moiety different from P$^1$, and [P$^5$]$_s$ is a phenolic moiety different from P$^3$, with r and s representing the mole percent of the respective monomers, r being about 5–20 mole percent, and s being about 5–30 mole percent.

21. The multilayer container of claim 20, wherein P$^1$ is 4-hydroxybenzoic acid, P$^2$ is terephthalic acid, P$^3$ is 4,4'-dihydroxybiphenyl, P$^4$ is 6-hydroxy-2-naphthoic acid, and P$^5$ is resorcinol; and m is 5 to 40, n is 5 to 40, q is 5 to 40, r is 5 to 30, and s is 5 to 10 percent.

22. The multilayer container of claim 20, wherein P$^1$ is 4-hydroxybenzoic acid, P$^2$ is terephthalic acid, P$^3$ is 4,4'-dihydroxybiphenyl, P$^4$ is 6-hydroxy-2-naphthoic acid, and P$^5$ is resorcinol; and m is 30, n is 20, q is 10, r is 30, and s is 10 percent.

23. A container formed from the multilayer laminate of claim 1, wherein said layer of non-liquid crystalline polyester (b) comprises monomeric residues selected from the group consisting of terephthalic acid, isophthalic acid, naphthalene dicarboxylic acid, ethyleneglycol, propylene glycol, and butylene glycol moieties, and mixtures thereof.

24. A container formed from the multilayer laminate of claim 1, wherein said layer of non-liquid crystalline polyester (b) is selected from the group consisting of polyethyleneterephthalate; polyethyleneisophthalate; polyethylene-2,6-naphthalate; polybutyleneterephthalate; polypropyleneterephthalate; post consumer recycled polyethylene terephthalate; copolyesters where the diacid component is terephthalic acid and derivatives thereof, isophthalic acid and derivatives thereof, 1,2-, 1,3-, 1,4-, 1,5-, 1,6-, 1,7-, 1,8-, 2,3-, 2,4-, 2,5-, 2,6-, 2,7, 2,8- isomers of naphthalene dicarboxylic acid and derivatives thereof, 4,4'-biphenyl dicarboxylic acid and derivatives thereof, 4,4'-diphenylether dicarboxylic acid and derivatives thereof, stilbenedicarboxylic acid and derivatives thereof, linear and mono and bis cyclic aliphatic dicarboxylic acids of 5–12 carbon atoms and derivatives thereof; copolyesters where the diol component is a linear aliphatic diol of 2–12 carbon atoms and derivatives thereof, 2-methyl-propanediol, 2,2'-dimethylpropanediol, cyclohexanediol, cyclohexanedimethanol, 1,3-bis(2-hydroxyethoxy)benzene and derivatives thereof, 1,4-bis(2-hydroxyethoxy)benzene and derivatives thereof, bis(4-beta-hydroxyethoxyphenyl) sulfone and derivatives thereof, diethyleneglycol, poly (ethylene) glycol, poly(propylene) glycol, poly (tetramethylene) glycol, glycerol and derivatives thereof, triethylolpropane and derivatives thereof, triethylolpropane and derivatives thereof, pentaerythritol and derivatives thereof; and combinations and blends thereof.

25. A method for forming a multilayer laminate comprising joining (a) at least one layer of a wholly aromatic liquid crystalline polymer which is stretchable at a temperature below 200° C., and (b) at least one layer of a non-liquid crystalline polyester to form a multilayer laminate, and stretching said multilayer laminate to at least 100 percent elongation while at a temperature below 200° C. and below the temperature of the molten state of layer (a) so as to achieve molecular orientation in layer (b).

26. The method for forming a multilayer laminate according to claim 25 wherein said stretching is conducted at a temperature above the glass transition temperature and below that of the molten state of said wholly aromatic liquid crystalline polymer.

27. The method for forming a multilayer laminate according to claim 26 wherein said stretching is conducted by expansion in a mold.

28. The method for forming a multilayer laminate according to claim 25 wherein said layers 1a) and (b) are formed and joined by coextrusion.

29. The method for forming a multilayer laminate according to claim 25 wherein said layers (a) and (b) are formed and joined by injection molding.

30. The method for forming a multilayer laminate according to claim 25 wherein said laminate is stretched by thermoforming into a shape having an innermost surface and an outermost surface, and further comprising the steps of placing said thermoformed multilayer laminate into a mold, and injecting a thermoplastic material into said mold to form an outer layer of said injected thermoplastic material in contact with said outermost surface of said thermoformed laminate.

31. A method for forming a multilayer laminate according to claim 25 wherein said laminate initially is provided as a preform and subsequently is expanded in a mold to produce said stretching.

32. A method for forming a multilayer laminate according to claim 31 wherein said preform is biaxially stretched.

33. A method for forming a multilayer laminate according to claim 25 wherein said wholly aromatic liquid crystalline polymer is a polyester and has repeat units corresponding to the formula:

$-[P^1]_m-[P^2]_n-[P^3]_q-$ wherein $P^1$, $P^2$ and $P^3$ represent residues of monomeric moieties, with $P^1$ being an aromatic hydroxy carboxylic acid, $P^2$ being an aromatic dicarboxylic acid, and $P^3$ being a phenolic compound; and m, n and q represent mole percent of the respective monomers with m, n, and q being about 5–40 percent individually.

34. A method for forming a multilayer laminate according to claim 33 wherein said wholly aromatic liquid crystalline polyester additionally contains repeat units of monomeric moieties $[P^4]_r$ and $[P^5]_s$, where $[P^4]_r$ is a second aromatic hydroxy carboxylic acid moiety different from $P^1$, and $[P^5]_s$ is a phenolic moiety different from $P^3$, with r and s representing the mole percent of the respective monomers, r being about 5–30 mole percent, and s being about 5–20 mole percent.

35. A method for forming a multilayer laminate according to claim 34, wherein $P^1$ is 4-hydroxybenzoic acid, $P^2$ is terephthalic acid, $P^3$ is 4,4'-dihydroxybiphenyl, $P^4$ is 6-hydroxy-2-naphthoic acid, and $P^5$ is resorcinol; and m is 5 to 40, n is 5 to 40, q is 5 to 40, r is 5 to 30, and s is 5 to 10 percent.

36. A method for forming a multilayer laminate according to claim 34 wherein $P^1$ is 4-hydroxybenzoic acid, $P^2$ is terephthalic acid, $P^3$ is 4,4'-dihydroxybiphenyl, $P^4$ is 6-hydroxy-2-naphthoic acid, and $P^5$ is resorcinol; and m is 30, n is 20, q is 10, r is 30, and s is 10 percent.

37. A method for forming a multilayer laminate according to claim 25 wherein said non-liquid crystalline polyester (b) comprises monomeric residues selected from the group consisting of terephthalic acid, isophthalic acid, naphthalene dicarboxylic acid, ethyleneglycol, propylene glycol, and butylene glycol moieties, and mixtures thereof.

38. A method for forming a laminate according to claim 25 wherein said non-liquid crystalline polyester (b) is selected from the group consisting of polyethyleneterephthalate; polyethyleneisophthalate; polyethylene-2,6-naphthalate; polybutyleneterephthalate; polypropyleneterephthalate; post consumer recycled polyethylene terephthalate; copolyesters where the diacid component is terephthalic acid and derivatives thereof, isophthalic acid and derivatives thereof, 1,2-, 1,3-, 1,4-, 1,5-, 1,6-, 1,7-, 1,8-, 2,3-, 2,4-, 2,5-, 2,6-, 2,7, 2,8- isomers of naphthalene dicarboxylic acid and derivatives thereof, 4,4'-biphenyl dicarboxylic acid and derivatives thereof, 4,4'-diphenylether dicarboxylic acid and derivatives thereof, stilbenedicarboxylic acid and derivatives thereof, linear and mono and bis cyclic aliphatic dicarboxylic acids of 5–12 carbon atoms and derivatives thereof; copolyesters where the diol component is a linear aliphatic diol of 2-12 carbon atoms and derivatives thereof, 2-methyl-propanediol, 2,2'-dimethylpropanediol, cyclohexanediol, cyclohexanedimethanol, 1,3-bis(2-hydroxyethoxy)benzene and derivatives thereof, 1,4-bis(2-hydroxyethoxy)benzene and derivatives thereof, bis(4-beta-hydroxyethoxyphenyl)sulfone and derivatives thereof, diethyleneglycol, poly(ethylene) glycol, poly(propylene) glycol, poly(tetramethylene) glycol, glycerol and derivatives thereof, trimethylolpropane and derivatives thereof, triethylolpropane and derivatives thereof, pentaerythritol and derivatives thereof; and combinations and blends thereof.

\* \* \* \* \*